US006225724B1

(12) United States Patent
Toide et al.

(10) Patent No.: US 6,225,724 B1
(45) Date of Patent: May 1, 2001

(54) MOTOR AND MOTOR ROTOR HAVING EMBEDDED PERMANENT MAGNETS

(75) Inventors: Yukari Toide; Akihiro Daikoku; Yuji Nakahara; Toyomi Ohshige; Yoshikazu Ugai, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/357,950

(22) Filed: Jul. 21, 1999

(30) Foreign Application Priority Data

Oct. 23, 1998 (JP) .................................................. 10-302187
Mar. 19, 1999 (JP) .................................................. 11-075612

(51) Int. Cl.[7] .............................. H02K 1/22; H02K 21/12
(52) U.S. Cl. ........................................... 310/216; 310/261
(58) Field of Search ..................................... 310/156, 216, 310/91, 254, 261, 43; 29/596–598

(56) References Cited

U.S. PATENT DOCUMENTS

| 4,924,130 | * | 5/1990 | Fratta | ..................................... 310/261 |
| 5,221,503 | * | 6/1993 | Ward et al. | ........................... 264/104 |
| 5,365,137 | * | 11/1994 | Richardson et al. | .................. 310/258 |
| 5,465,019 | * | 11/1995 | Kliman | ................................. 310/156 |
| 5,510,662 | * | 4/1996 | Tanimoto et al. | .................... 310/156 |
| 5,684,352 | * | 11/1997 | Mita et al. | ........................... 310/156 |
| 5,783,895 | * | 7/1998 | Hakala et al. | ........................ 310/268 |
| 5,875,540 | * | 3/1999 | Sargeant et al. | ....................... 29/596 |
| 5,925,964 | * | 7/1999 | Kusase et al. | ........................ 310/263 |
| 5,945,760 | * | 8/1999 | Honda et al. | ......................... 310/156 |
| 6,008,559 | * | 12/1999 | Asano et al. | .......................... 310/156 |

FOREIGN PATENT DOCUMENTS 10112946    4/1998    (JP) .
10256031    9/1998    (JP) .

* cited by examiner

Primary Examiner—Tran Nguyen
(74) Attorney, Agent, or Firm—Leydig, Voit & Mayer, Ltd.

(57) ABSTRACT

A motor embedded with magnets having good properties and productivity. A rotor of this motor includes a rotor core with laminated rotor core plates punched out of an electromagnetic steel plate and studded with bonded magnets of a powdered permanent magnet material and a resin in groups of slits located in the rotor core for each pole of the rotor.

5 Claims, 7 Drawing Sheets

MOTOR AND MOTOR ROTOR HAVING EMBEDDED PERMANENT MAGNETS

BACKGROUND OF THE INVENTION

1. Field of the Invention

The present invention relates to a motor having a rotor embedded with permanent magnets and a method of manufacturing the motor.

2. Discussion of Background

When permanent magnets of a sintered type are embedded in a motor, the motor is manufactured by inserting permanent magnets into slits formed in a rotor core and filling the gaps caused by errors in their form by a filler and/or a bonding agent and then fixing the permanent magnets to the rotor core by mechanically joining the permanent magnets to the rotor core using joining methods like bolts and nuts, methods have obstructive factors in forming the permanent magnets which reduce productivity of the motor assembly. Further, in the case where the permanent magnets are formed by injecting a powdered material constituting permanent magnets, it is necessary to introduce a rotor under a high temperature of 500° C. or more for a long period, which requires expensive equipment and reduces reliability due to residual stress and deformation caused by the application of heat to the rotor, and so on.

FIG. 14 is disclosed in JP-A-10-112946 to solve the above-mentioned problems, wherein a structure of rotor of a brush-less d.c. motor with embedded permanent magnets is shown. In FIG. 14, permanent magnets formed by bonding magnetic powders having a hard magnetic phase and a resin with a soft magnetic phase are inserted in slots 2 formed at four positions in a rotor core 1; and thereafter the permanent magnets are fixed to the rotor core 1 by adhering or mechanically joining using bolts and nuts.

However, failures caused by peeling-off, cutout, and so on occurred to the permanent magnets during high revolutions for a long period even though such joining methods were used.

SUMMARY OF THE INVENTION

It is an object of the present invention to solve the above-mentioned problems inherent in the conventional technique and to provide a motor embedded with permanent magnets which can be manufactured by shortening the time for forming permanent magnets while increasing productivity.

According to a first aspect of the present invention, there is provided a motor embedded with permanent magnets which is integrally formed by directly injecting bond magnets made of a resin having dispersed powders of permanent magnet material into slits, respectively provided in each of various poles of a rotor core, and by curing the bond magnets. This removes the need for using a bonding agent or a filler and fixing of the permanent magnets using mechanically binding means such as bolts and nuts.

According to a second aspect of the present invention, there is provided the motor embedded with permanent magnets, wherein the resin forming the bond magnets is a thermoplastic resin.

According to a third aspect of the present invention, there is provided the motor embedded with permanent magnets, wherein the resin forming the bond magnets is a thermoset resin.

According to a fourth aspect of the present invention, there is provided the motor embedded with permanent magnets, wherein a rotor is composed of a plurality of rotor blocks piled in its axial direction, the rotor blocks respectively formed by laminating a plurality of rotor core plates.

According to a fifth aspect of the present invention, there is provided the motor embedded with permanent magnets, wherein the rotor blocks have spacers formed thereon being made of thin layers of the bond magnets having shapes of recesses and projections, complementary each other, respectively on surfaces in the axial direction of the rotor blocks; and the rotor blocks are piled so that the recesses and projections of adjoining spacers of the rotor blocks are engaged with each other.

According to a sixth aspect of the present invention, there is provided a method of manufacturing a motor embedded with permanent magnets comprising steps of: injecting bond magnets, made of a thermoplastic resin including dispersed powders of permanent magnets material having a melt flow rate of 0.3 or more under test conditions of a temperature of 300° C., a load of 20 kg-f, an inner diameter of die of 1.0 mm, and a thickness of die of 1.0 mm in conformity with a definition of JISK7210, into slits respectively provided in each of poles of rotor core by heating and fluidizing the bond magnets, and curing the bond magnets.

According to a seventh aspect of the present invention, there is provided a method of manufacturing a motor embedded with permanent magnets comprising steps of: injecting bond magnets, made of a thermoset resin including dispersed powders of permanent magnets material having a viscosity of 1,000 through 10,000 cP, into slits respectively provided in each of poles of rotor core, and curing the bond magnets.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 14 as follows. For simplicity the same numerical references are used for the same or similar portions and description of similar portions is omitted. Similarly, in descriptions of embodiments, portions overlapping those of precedent embodiments are omitted.

Figure 1:
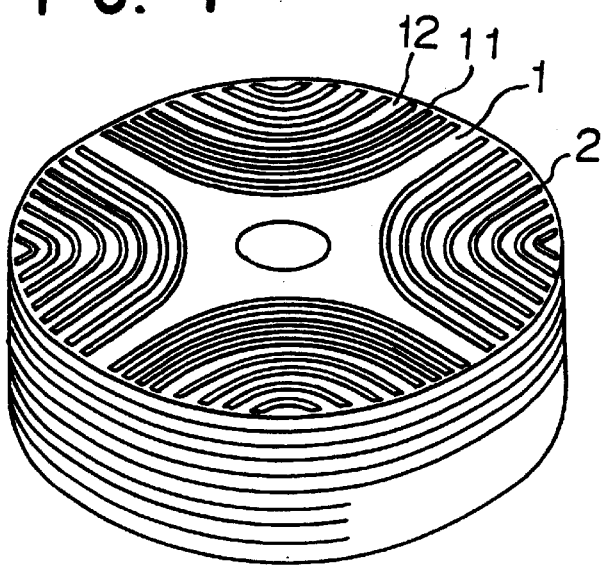
FIG. 1 is a perspective view showing a rotor core assembly of a motor embedded with magnets according to the present invention.

FIG. 1 is a perspective view of a rotor core assembly of a motor embedded with magnets having four poles for showing Embodiment 1 of the present invention. In FIG. 1, numerical reference 1 designates a rotor core made of electromagnetic steel, in which a number of slits 11 and a number of magnetic paths 12 are formed in a direction of a center of the rotor core to have a projected shape. In FIG. 1, an example that nine layers of slits 11 and eight layers of magnetic paths 12 are used is shown. Magnets made of a matrix polymer having powdered material of permanent magnets (hereinbelow referred to as bond magnets) 2 dispersed therein are embedded in the slits 11.

The number of layers of permanent magnets provided in each pole influences properties of the bond magnets used for embedding and a distribution of magnetic flux in air gaps. Therefore, it is necessary to appropriately determine the number of the slits 11 and the number of the magnetic paths 12 in response to the properties of the bond magnets to be used and a performance of desirable motor embedded with magnets, wherein FIG. 1 is one of such examples.

The diameter of the rotor core 1 is 60 mm and formed by laminating thirty rotor core plates punched out of a silicon steel plate having a thickness of 0.35 mm to be a predetermined shape, each of the rotor core plates being formed with nine slits having a width of 0.5 mm with equal intervals of 0.5 mm for the number of poles, i.e. four groups. The bond magnets 2 are filled with a pressure of 1,000 kg-f/cm$^2$ at rate of 35 cm$^3$/s, after being heated to 170° C. so as to be fluidized, to a mold attached to an injection molding equipment, in which mold the rotor core 1 is settled, wherein the bond magnets are made of the matrix polymer of nylon 12 and the powdered material of permanent magnet is ferrite powders. Magnets for orientating are disposed in the mold, the magnets for orientating are magnetized simultaneously with formation of the bond magnets.

Figure 2:
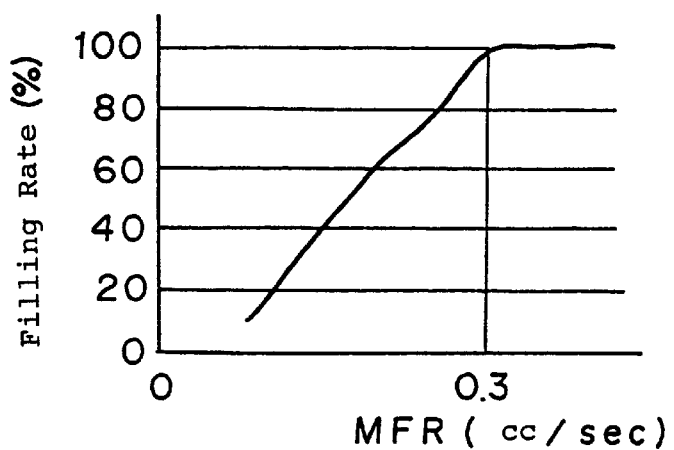
FIG. 2 is a graph illustrating a relationship between rheological characteristics of bond magnets made of a thermoplastic matrix polymer and a rate of filling the bond magnets into slits.

FIG. 2 is a graph for illustrating a relationship between a melt flow rate indicating rheological characteristics of the bond magnets and a filling rate of the bond magnets into an internal space of the slits 11 at a time of manufacturing the rotor core assembly using the bond magnets made of a plurality of thermoplastic matrix polymers having different viscosities as described with reference to FIG. 1. Characteristics of filling the bond magnets into the slits are evaluated by the melt flow rate (hereinbelow referred to as MFR) in testing conditions of a temperature of 300° C., a load of 20 kg-f, a diameter of die of 1.0 mm, and a thickness of die of 1.0 mm, in conformity with the standards of JISK7210. When MFR of the bond magnets is 0.3 cc/sec or more, the filling rate of the bond magnets into the inside of the slits becomes substantially 100%. However, when the MFR is lower than 0.3 cc/sec, the filling rate is abruptly dropped.

It is assured that the relationship between the MFR and the filling rate of the bond magnets scarcely depends on types and content rates of the matrix polymers and the powdered materials of the permanent magnets. Therefore, it is preferable that the MFR of the bond magnets filled into the slits is 0.3 cc/sec or more.

Figure 3:
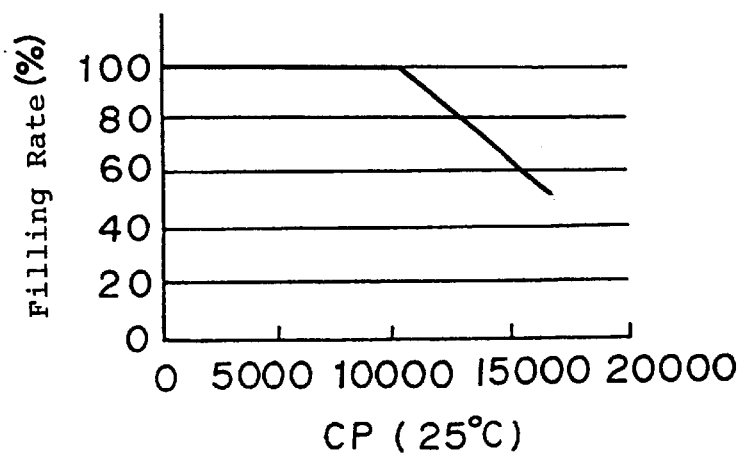
FIG. 3 is a graph illustrating a relationship between rheological characteristics of bond magnets made of a thermoset matrix polymer and a rate of filling the bond magnets into slits.

It is also possible to use a thermoset resin as the matrix polymer. FIG. 3 is a graph concerning the bond magnets using a plurality of thermoset matrix polymers having different viscosities, corresponding to FIG. 2. A filling rate of bond magnets into the inside of the slits is substantially 100% when the viscosity is 10,000 cP or less. When the viscosity is more than 10,000 cP, the filling rate is abruptly lowered. A lower limit of viscosity should be about 1,000 cP in consideration of stability of distribution of particles of the powdered material of permanent magnet in the matrix polymer and leakages from the mold at a time of filling into the slits. Therefore, it is desirable that the viscosity of bond magnet is in a range of 1,000 cP through 10,000 cP at a temperature of 25° C.

The material of permanent magnet may be powders of ferrite or powders of neodymium system or samarium cobalt system. The matrix polymer can be properly selected in response to a heat proof margin of a motor, wherein the above-mentioned nylon, polyphenylenesulfide (PPS), ethylene-ethylacrylate (EEA), or the like is used as the thermoplastic resin, and epoxy, polyimide, or the like is used as the thermoset resin.

By appropriately selecting the powdered material of permanent magnet and the matrix polymer, it is possible to embed the bond magnets having extremely variable characteristic into the rotor core of the motor embedded with magnets.

Figure 4:
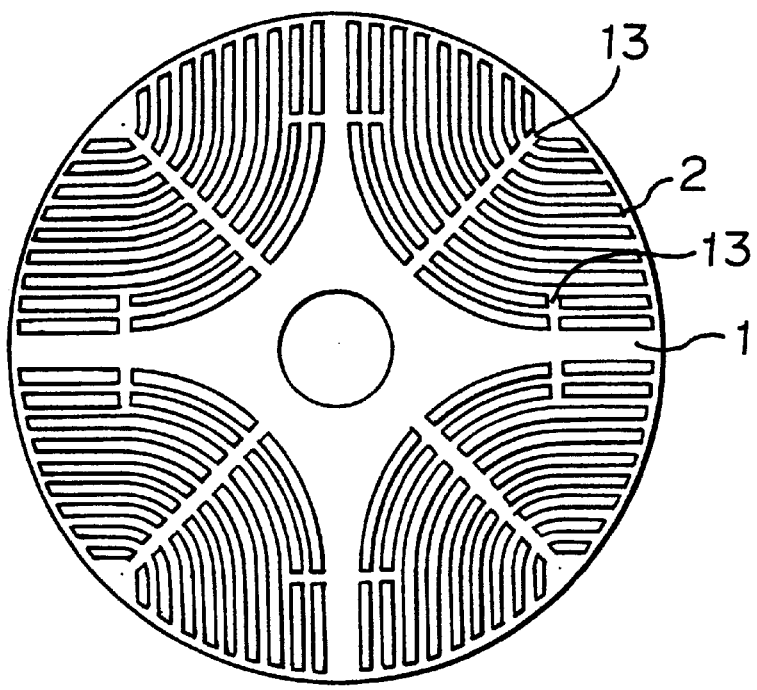
FIG. 4 is a plan view of a rotor core assembly for showing arrangement of slits according to the present invention.

In the rotor core assembly shown in FIG. 1, the bond magnets 2 are embedded by connecting adjoining poles by continuous slits 11. It is also possible to appropriately separate slits 11 by forming bridges 13 as shown in FIG. 4. This is to avoid deformation of magnetic paths 12 being barriers between the slits 11 caused by enhancement of mechanical strength of the rotor core assembly and a pressure difference of the bond magnets among the slits at a time of injecting the bond magnets 2 into the slits 11 at a high pressure. Further, it is possible to use an example that the slits are opened into an outer peripheral surface of the rotor core for preventing magnetic leakage paths from emerging at around the outer periphery of the rotor core. FIG. 4 shows only an example of separating the slits, and therefore, the method is not limited to that shown in FIG. 4.

Figure 5:
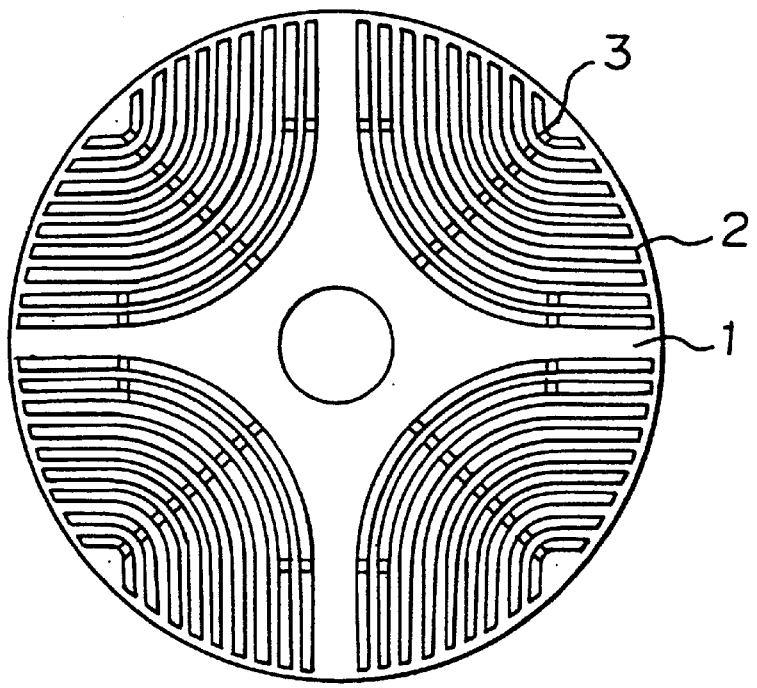
FIG. 5 is a plan view of a rotor core assembly for showing a method of injecting bond magnets according to the present invention.
Figure 6:
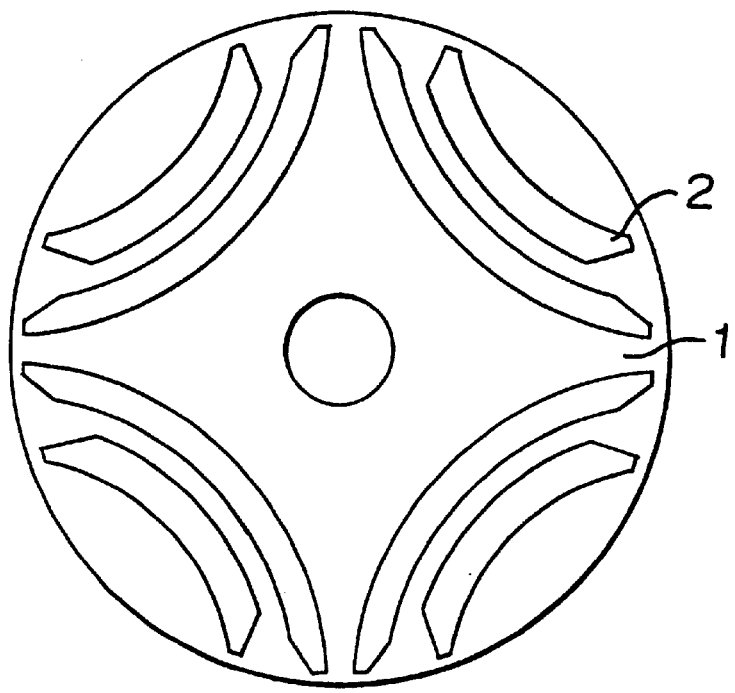
FIG. 6 is a plan view of a rotor core assembly for showing a variation of arrangement of permanent magnets according to the present invention.
Figure 7:
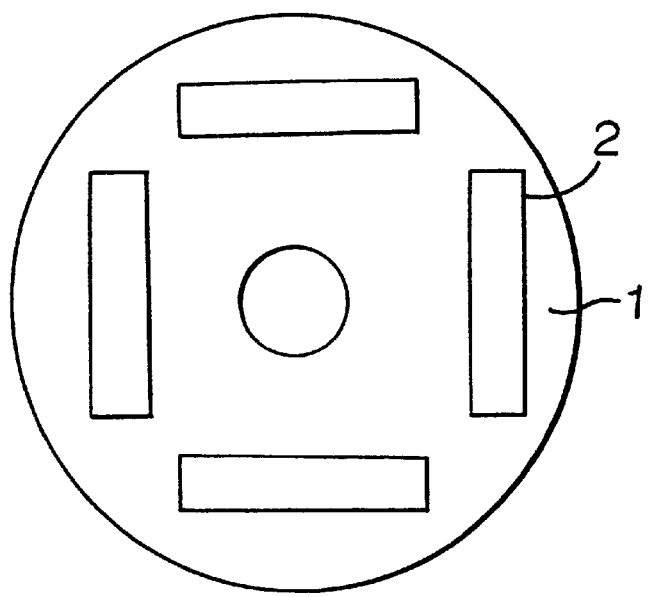
FIG. 7 is a plan view of a rotor core assembly for showing another variation of arrangement of permanent magnets according to the present invention.
Figure 8:
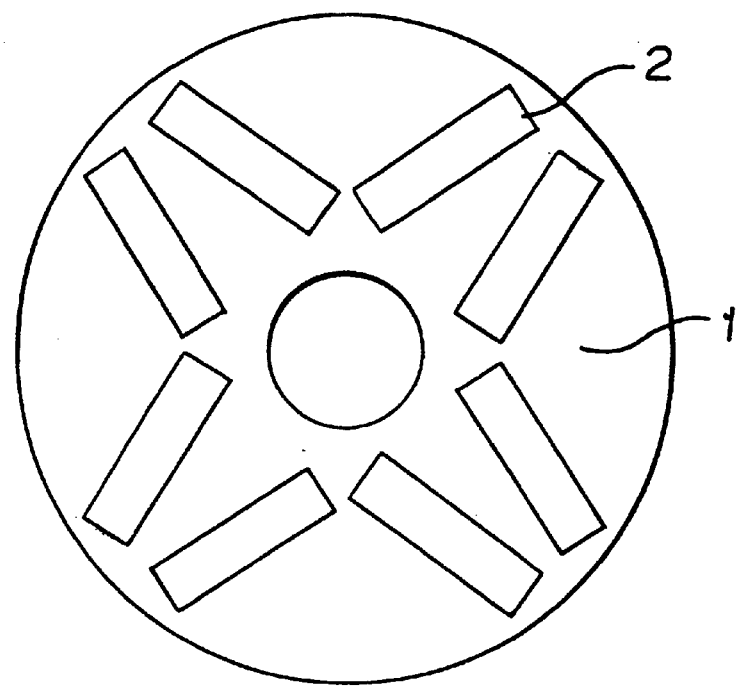
FIG. 8 is a plan view of a rotor core assembly for showing another variation of arrangement of permanent magnets according to the present invention.
Figure 9:
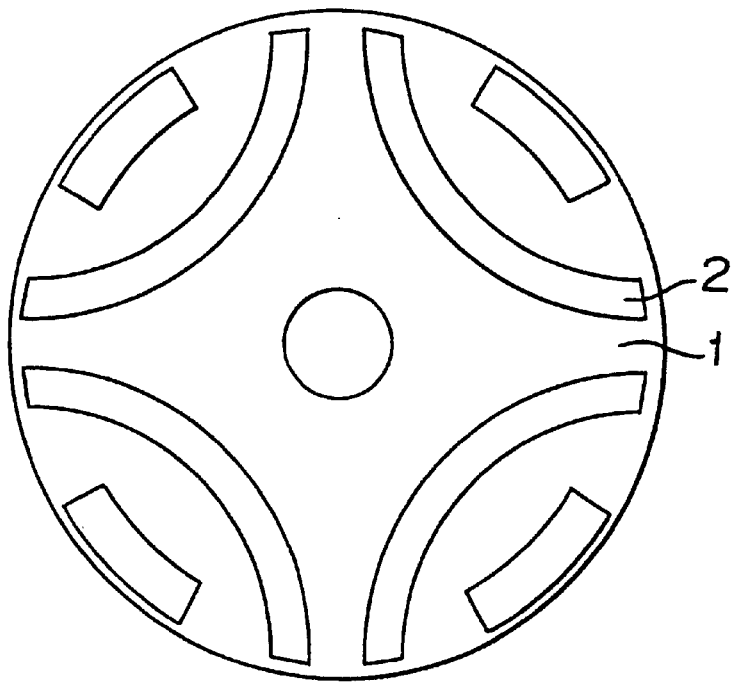
FIG. 9 is a plan view of rotor core assembly for showing another variation of arrangement of permanent magnets according to the present invention.

In order to avoid the deformation of the magnetic paths being the barriers between the slits 11 caused at a time of injecting the bond magnets 2, it is possible to inject the bond magnets under a state that pins 3 are inserted in longitudinal directions of the slits with appropriate intervals as shown in FIG. 5. The pins 3 are fixed to the mold for forming the bond magnets or to projections or recesses properly disposed in the slits at positions of fixing the pins. The pins 3 may be removed after curing the bond magnets or maintained without removal. In case that the pins 3 are maintained without removing, it is preferable to use a non-magnetic material. By such a structure, it is possible to improve magnetic characteristics because the magnetic leakage paths formed by the bridges 13 in the above-mentioned method of separating the slits do not exist. Further, it is possible to combine the method of separating the slits with the method of inserting the pins.

By constructing as above, it is possible to arbitrarily determine shapes of permanent magnet in comparison with a conventional motor embedded with magnets. Particularly, it is easy to make the magnet thin.

The bond magnets 2 are magnetized by the magnets for orientating disposed on the mold at a time of curing after injection. Succeedingly, the bond magnets 2 are once demagnetized after a completion of curing and magnetized later again. Needless to say that the bond magnets 2 are magnetized after curing without magnetizing by the magnets for orienting. For magnetization, a device for magnetizing using pulsating magnetic fields or the like may be used.

Although the nine slits 11 and the eight magnetic paths 12 are described above, shapes of permanent magnet can be arbitrarily determined because there is a sufficient degree of freedom in forming the bond magnets. FIGS. 6 through 9 show variations of arrangement of permanent magnets. However, arrangement patterns of permanent magnet are only examples and a content of invention is not limited to these examples. Because the permanent magnets are firmly in contact with the rotor core at the time of curing, it is not necessary to fix the permanent magnets using fixing by bonding agents and/or fillers or a mechanically binding means such as bolts and nuts.

Further, although the rotor core plates are formed by punching out the silicon steel plate above, it is not limited thereto. For example, the rotor core plates may have a block-like shape, being integrally formed out of a magnetic material by a method like etching.

Embodiment 2

Figure 10:
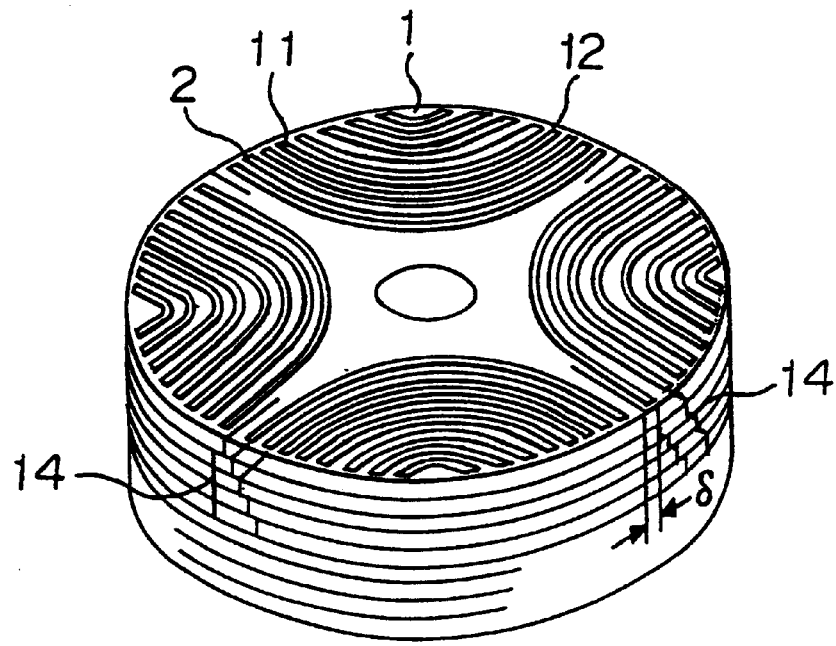
FIG. 10 is a perspective view of a rotor core assembly for showing a structure of skewed core according to the present invention.

FIG. 10 is a perspective view of a rotor core assembly of a motor embedded with magnets according to Embodiment 2 of the present invention. In FIG. 10, numerical reference 14 designates marks indicating intermediate positions of a group of slits, which marks indicate positions common to laminated core plates. In FIG. 10, a method of realizing skewed core aimed to prevent pulsations of output torque and noises by a high harmonic current from occurring, which pulsations and noises are caused depending on combinations of spaces of coil slots provided in an inner diameter of a stator assembly and spaces between magnetic poles at an outer periphery of the rotor core assembly.

The marks 14 in the core plates composing the rotor core assembly are successively shifted in a rotational direction as the core plates are laminated. In a similar manner to those described in FIG. 1, the rotor core 1 formed by laminating the core plates while successively shifting in the rotational direction has bond magnets 2 embedded in their slits. It is preferable to make a deviation δ between the core plates a half or less of the width of the slits 11 so that the bond magnets are equally injected into the slits. The above-mentioned mark 14 is referred to, for the convenience, in describing the present invention. Therefore, it is not requisite for the core plates. Cutouts having a notch-like shape provided in an outer periphery of the core plates may be used instead of the marks 14 for the purpose of, for example, registering the core plates.

Figure 11:
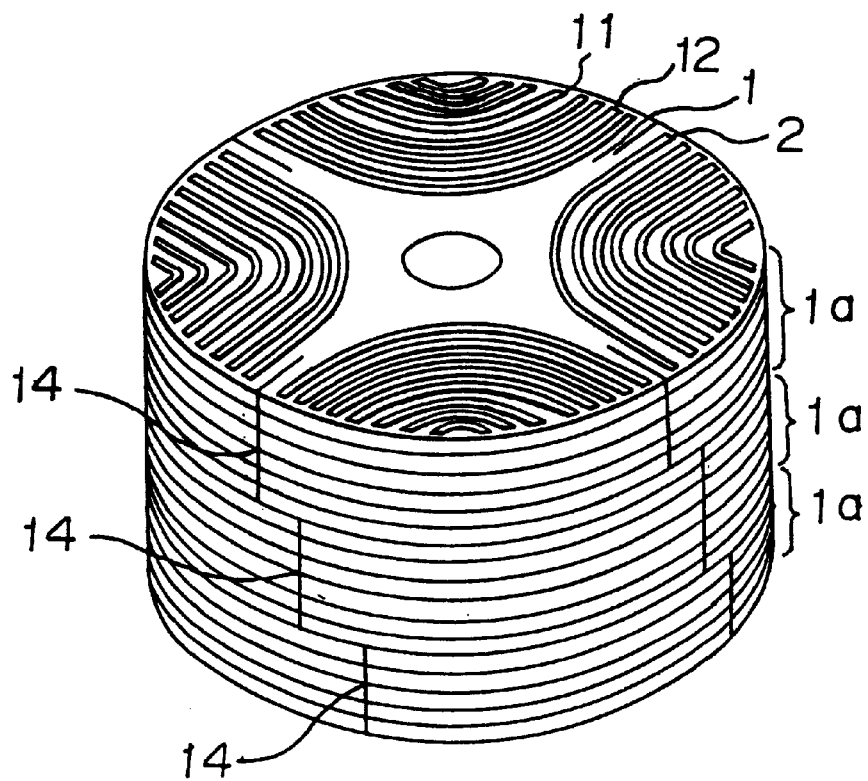
FIG. 11 is a perspective view of a rotor core assembly for showing another structure of skewed core according to the present invention.

Another method of realizing the skewed core will be described in reference of FIG. 11.

Sets of core blocks obtained by dividing the height of rotor core to a predetermined number are laminated. Bond magnets 2 are embedded in slits of each of the sets of core block 1a in a similar manner to that described in reference of FIG. 1. The sets of core block 1a are piled while shifting marks 14, respectively of the sets of core block 1a, in their rotational direction to thereby form a rotor core assembly. By constituting the rotor core assembly as such, it is possible to obtain the magnitude of skewed core irrespective of intervals of the slits. Further, because the bond magnets 2 are embedded after dividing the height of the laminated rotor core, a pressure of injecting the bond magnets 2 into the slits 11 can be low, whereby magnetic paths 12 being barriers between the slits 11 are scarcely deformed.

Embodiment 3

Figure 12:
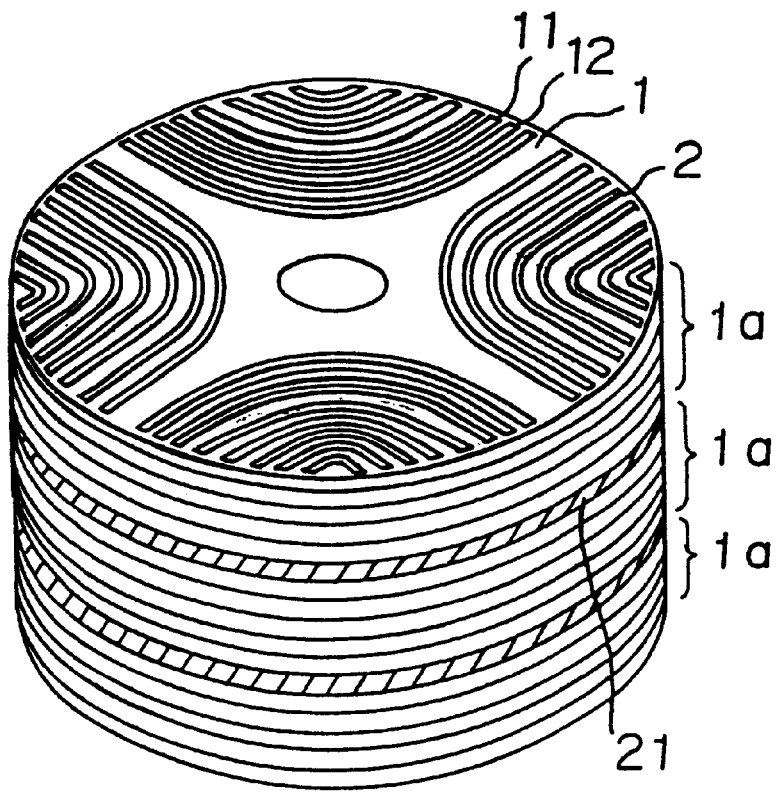
FIG. 12 is a perspective view of another rotor core assembly of a motor embedded with magnets according to the present invention.
Figures 13A, 13B:
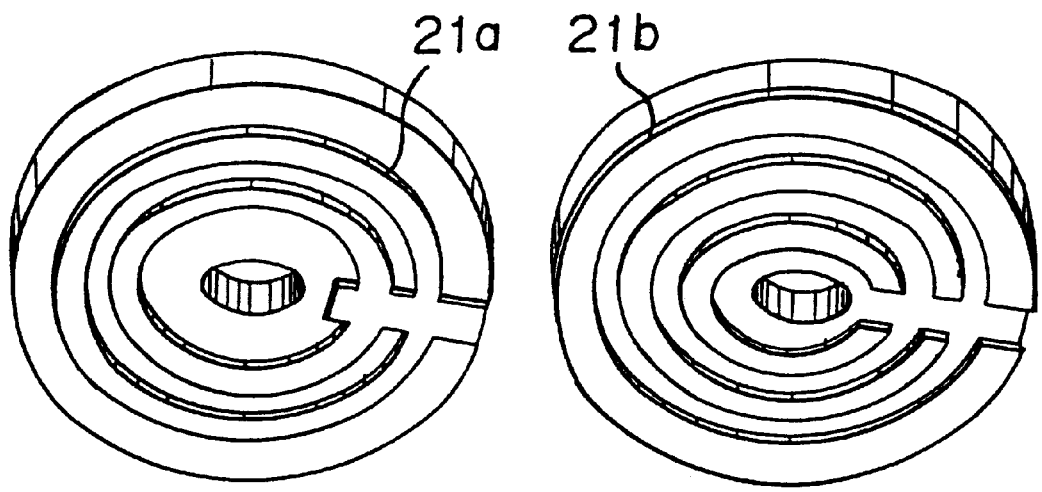
FIGS. 13A and 13B are a perspective views of core blocks for showing overlapped surfaces of the core blocks of a rotor core assembly according to the present invention.
Figure 14:
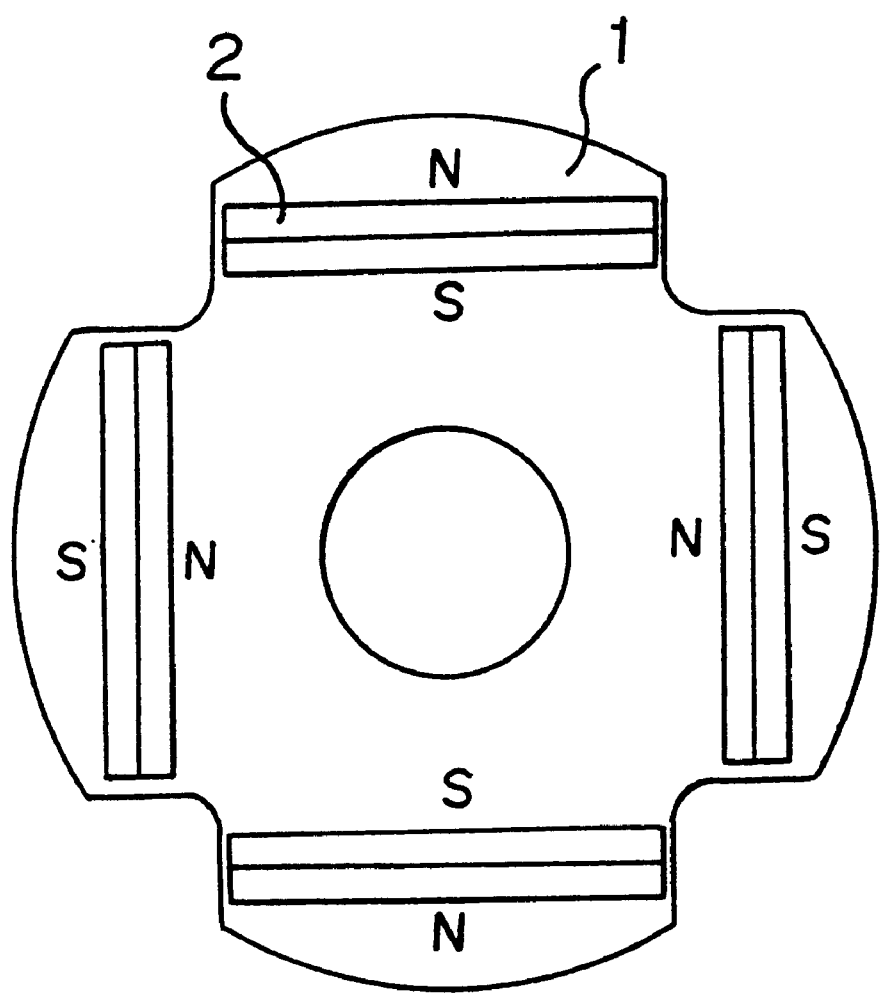
FIG. 14 schematically shows a structure of a rotor of a conventional motor embedded with magnets.

FIG. 12 is a perspective view of a rotor core assembly of a motor embedded with magnets according to Embodiment 3 of the present invention. FIGS. 13A and 13B are perspective views of core blocks 1a of a rotor core for showing overlapping surfaces of the core blocks 1a. In FIGS. 12, 13A and 13B numerical reference 21 designates interposed pieces formed between the overlapped surfaces of the core blocks 1a; numerical references 21a and 21b designate interposed pieces respectively formed on two surfaces to be overlapped each other, wherein the interposed pieces 21a and 21b have the same thicknesses and are in complementary shapes, in which each of recesses is inverted at each of corresponding projections. When recesses and projections are mutually engaged between the interposed pieces 21a and 21b, a positional relationship between the slits and the interposed pieces 21a or 21b is set so that the slits 11 are arranged in a straight line in the entire height of the laminated rotor core assembly or the skewed core is established as in a similar manner to that described in reference of FIG. 9.

As described in reference of FIG. 1, it is necessary to use a means of injection molding or the like for filling by injecting bond magnets 2 into the slits 11. In order to inject the bond magnets 2 into the slits 11, it is necessary to provide a flow path of the bond magnets 2 at a portion of a mold for forming bond magnet opposite to the overlapping surface of core block. By forming a shape of the flow path inversed with respect to the interposed piece 21a or 21b, the interposed pieces 21a and 2b are completed when the bond magnets 2 are formed in the slits 11. The thickness of the interposed pieces 21 is necessary to be small enough to keep a ratio of the total thickness of core plates to the laminated height of the rotor core assembly, i.e. an occupying rate of the core plates, without substantial decrement. By constructing the rotor as described above, it is possible to omit an operation of removing burrs on the overlapped surfaces after forming the bond magnets, and it becomes easy to register a rotational direction in an operation of overlapping the core blocks, whereby productivity is improved.

The first advantage of the present invention is that a rotor embedded with permanent magnets having a shape with extremely high degrees of freedom can be realized, and it is not necessary to fix the permanent magnets by securing using a bonding agent and/or a filler or by a mechanically binding means such as bolts and nuts since the permanent magnets are firmly in contact with the rotor core after curing.

The second advantage of the present invention is that bond magnets having extremely variable characteristics can be embedded in a rotor core of a motor embedded with magnets.

The third advantage of the present invention is that bond magnets can be embedded by dividing the laminated heights of rotor core; a pressure of injecting the bond magnets into slits can be small; magnetic paths being barriers between slits are scarcely deformed; and preferable skewed core can be realized by successively shifting phases of rotor blocks in their rotational direction when the rotor blocks are piled in their axial direction.

The fourth advantage of the present invention is that an operation of removing burrs can be omitted and registration in a rotational direction of core block in an operation of overlapping the core blocks becomes easy, whereby productivity is improved.

Obviously, numerous modifications and variations of the present invention are possible in light of the above teachings. It is therefore to be understood that within the scope of the appended claims, the invention may be practiced otherwise than as specifically described herein.

What is claimed is:

1. A motor having embedded permanent magnets comprising a rotor including
   a plurality of laminated core blocks, each core block having two surfaces perpendicular to an axial direction of the motor and containing a plurality of rotor core plates, the rotor core plates being made from a magnetic material, each of the plurality of core blocks including independent embedded permanent magnets, and
   spacers respectively comprising a thin layer of the permanent magnets on both of the two surfaces of the plurality of core blocks, the spacers having mutually complementary shaped recesses and projections, the core blocks being laminated so that the recesses and the projections of the spacers in adjoining core blocks are engaged, each of the rotor core plates having a plurality of slits with embedded permanent magnets in the slits, the permanent magnets comprising a powered permanent magnet material dispersed in a resin and located in a group of slits for each pole of said rotor.

2. A rotor for an electric motor comprising:
   a plurality of substantially identical sheets of magnetic material, each sheet including groups of slits, each group including a plurality of slits for forming a respective pole of the rotor, the plurality of sheets being laminated and axially aligned and the slits within each of the sheets being substantially aligned with the slits in an adjacent sheet;
   a polymer matrix in which a powder of a permanent magnet material is dispersed, filling the slits in each of the sheets of the magnetic material; and
   a plurality of non-magnetic pins, each of the pins extending through the laminated sheets at a mid-point of a respective slit.

3. A rotor for an electric motor comprising:
   a plurality of substantially identical sheets of magnetic material, each sheet including groups of slits, each group including a plurality of slits for forming a respective pole of the rotor, the plurality of sheets being laminated and axially aligned and the slits within each of the sheets being substantially aligned with the slits in an adjacent sheet;
   a polymer matrix in which a powder of a permanent magnet material is dispersed, filling the slits in each of the sheets of the magnetic material; and
   a plurality of non-magnetic voids, each of the voids extending through the laminated sheets at a mid-point of a respective slit.

4. A rotor for an electric motor comprising:
   a plurality of substantially identical sheets of magnetic material, each sheet including groups of slits, each group including a plurality of slits for forming a respective pole of the rotor, the plurality of sheets being laminated and axially aligned and each of the sheets being rotationally offset, about an axial direction, relative to an adjacent sheet and
   a polymer matrix in which a powder of a permanent magnet material is dispersed, filling the slits in each of the sheets of the magnetic material.

5. A rotor for an electric motor comprising:
   a plurality of substantially identical sheets of magnetic material, each sheet including groups of slits, each group including a plurality of slits for forming a respective pole of the rotor, the plurality of sheets being laminated and axially aligned and wherein the plurality of sheets are divided into groups, each group including an identical number of sheets, the sheets within each group of sheets being axially aligned, each group of sheets being rotationally offset, about an axial direction, with respect an adjacent group of sheets; and
   a polymer matrix in which a powder of a permanent magnet material is dispersed, filling the slits in each of the sheets of the magnetic material.

* * * * *